United States Patent
Pattyn

[11] Patent Number: 5,878,528
[45] Date of Patent: Mar. 9, 1999

[54] TREE PROTECTOR

[76] Inventor: Emil Albert Cornelius Pattyn, RR3, Mount Brydges, Ontario, Canada, N0L 1W0

[21] Appl. No.: 826,679

[22] Filed: Apr. 7, 1997

[51] Int. Cl.$^6$ .................................................. A01G 13/02
[52] U.S. Cl. ................................................................ 47/25
[58] Field of Search ................................ 47/25, 26, 23

[56] References Cited

U.S. PATENT DOCUMENTS

| D. 299,409 | 1/1989 | Inglis | D8/1 |
|---|---|---|---|
| 2,978,837 | 4/1961 | Daniels | 47/25 |
| 4,268,992 | 5/1981 | Scharf, Sr. | 47/25 |
| 4,584,789 | 4/1986 | Jean et al. | 47/25 |
| 4,642,938 | 2/1987 | Georges et al. | 47/2 |
| 4,648,203 | 3/1987 | Worzek | 47/32 |
| 4,700,507 | 10/1987 | Allen | 47/23 |
| 4,986,025 | 1/1991 | Imperial | 47/25 |
| 5,231,793 | 8/1993 | Allen | 47/25 |
| 5,367,822 | 11/1994 | Beckham | 47/25 |

*Primary Examiner*—Thomas Price
*Assistant Examiner*—Joanne C. Downs
*Attorney, Agent, or Firm*—Anthony Asquith & Co.

[57] ABSTRACT

The protector comprises two plastic moldings, fastened together to form a cone around a tree planted in a city avenue. The protector prevents salt from leaching down to the root-ball of the tree, and protects the tree from damage from snow and slush piled around the tree. The protectors are temporary, and the fasteners used can be removed by the authorities, but are of the vandal-resistant type.

18 Claims, 3 Drawing Sheets

TREE PROTECTOR

This invention relates to the protection of trees, and especially to protection from damage by salt to young trees, recently planted by the side of a road.

BACKGROUND TO THE INVENTION

Typically, it takes roughly two years for a roadside-planted tree to become established as a self-sustaining tree. During that time, the tree is especially vulnerable to damage, including mechanical damage, and especially to damage by salt.

In the colder climates, in winter, it is common practice to apply salt to the roads. It is common practice also in winter to snow-plough the roads. As a result, it is common for piles of snow, which often contain high concentrations of salt, to lie heaped at the roadside, sometimes for weeks, and even for months, during the winter.

The roadside, in fact, is a highly disadvantageous location for a new tree. Even if it survives the mechanical damage occasioned by the heaping of the snow, the tree will be surrounded by salt-laden snow for long periods. The salt leaches down through the snow, through the soil, and into the root system of the tree. At the end of winter, when the snow and the ground thaws out, the salt concentration in the soil and roots can be expected to be high: but early spring is just the time when the growth of the tree should be at its most vigorous.

If the salt were to be completely effective in melting the accumulated snow, the situation might be even worse. The melted snow and slush is swept or ploughed onto the verge, with the concentrated salt contained therein. The liquid water then either evaporates or soaks into the ground. Either way, much of the salt leaches into the ground. Of course, some of the salt is washed into the sewers. But a good deal of the salt enters the root-balls of trees planted by the roadside. The salt can remain in the soil for long periods, and builds up over the years as a background level, whereby the rise in salt level over the winter can aggregate to an excessive level.

As a result, roadside trees planted in areas where salt is used to keep the roads clear in winter, are notoriously difficult to establish. In some cases, as many as sixty percent of planted trees fail to become established.

On the other hand, city authorities do desire trees to be established in residential avenues. It is an aim of the invention to provide a means whereby trees may be protected from the effects of heaping salt-laden snow and slush around the not-yet-established trees, which have been recently planted at the side of a road.

It has also been the practice for city authorities to provide mulch on the ground around young trees, to absorb the salt. This practice, though expensive, is effective; however, after the winter, the salt-laden mulch now has to be removed and disposed of. It is an aim of the invention to protect the young trees from salt, but in a manner that does not interfere with the disposal of the salt by normal drainage.

GENERAL FEATURES OF THE INVENTION

The invention lies in a tree protector, comprising a cover of weather-resistant material, such as moulded plastic sheet, having the general form of an inverted funnel or cone. The protector includes an outer rim, a conically-sloping portion, and a central aperture.

The protector is preferably in two completely-separable halves, which are joined together by fastenable-unfastenable joint means. The joint means is so constructed and arranged that, upon the joint means being separated and unfastened, the outer rim, the conically-sloping portion, and the central aperture are open to a sufficient extent as to permit the protector to be applied to, and assembled around, in a radial or lateral direction, the trunk of an already-planted tree, and to rest on the ground in which the tree is planted, and to be removed from around the tree without disturbing the tree.

Preferably, the protector includes fastening means, for fastening the joint means closed. The joint means is so constructed and arranged that, upon the joint means being closed and fastened by the fastening means, the outer rim, the conically-sloping portion, and the central aperture are closed to a sufficient extent as to prevent the protector from being removed from the tree, the trunk of the tree lying within the aperture when the joint means is closed and fastened.

The aperture is large enough to fit loosely around the trunk of the tree, but the aperture is small enough as to permit little or no slush to enter between the aperture and the trunk. Preferably, the aperture is formed in a neck of the protector, and the protector is so shaped that the neck merges smoothly into the conically-sloping portion, whereby slush landing upon the neck or conically-sloping portion is urged downwards and away from the tree trunk.

THE INVENTION IN RELATION TO THE PRIOR ART

Previous patents showing devices that fit around trees, for various purposes, include: U.S. Pat. No. 4,584,789; U.S. Pat. No. 4,462,938; U.S. Pat. No. 4,648,203; U.S. Pat. No. 4,700,507; U.S. Pat. No. 4,986,025; U.S. Pat. No. 5,231,793; D-299,409. None of these prior patents shows a removable structure that would be effective to support salt-laden slush off the ground, and to divert salty water away from leaching down to the root-ball of the tree. The invention is aimed at combining effective protection for the new trees, and yet without undue expense, without needing high labor costs to install and de-install the device and to transport the device in large quantities to and from a depot, and without the device being vulnerable to vandalism.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
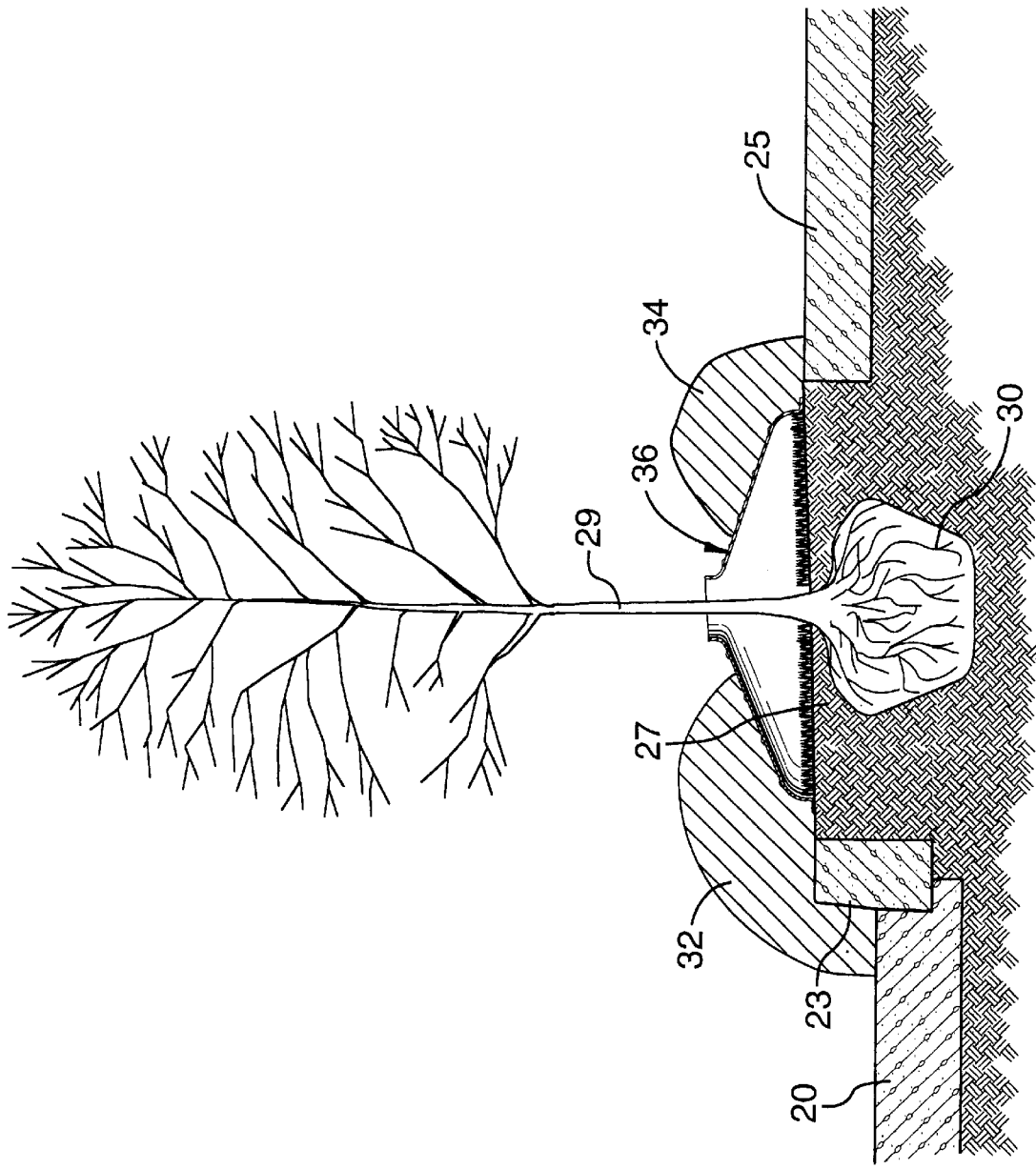
FIG. 1 is a cross-section of the side of a tree-lined avenue, in which the tree has a protector constructed in accordance with the invention assembled thereto.

FIG. 1 is a cross-section of the side of a city avenue, showing the roadway pavement 20, the kerb 23, side-walk 25, and the grass verge 27. A tree 29 is planted in the grass verge.

The tree has a root-ball 30, in which the roots are contained and bound, together with the soil in which the tree was grown in the nursery. The root-ball remains unitary and integral with the tree during and after planting.

In winter, snow or slush ploughed from the roadway lies heaped, at 32. A lesser heap 34 contains snow or slush ploughed from the sidewalk. Both heaps contain salt. The tree protector 36 keeps the salt-laden snow or slush away from the tree, and prevents salt from soaking into the ground and into the root-ball.

Figure 2:
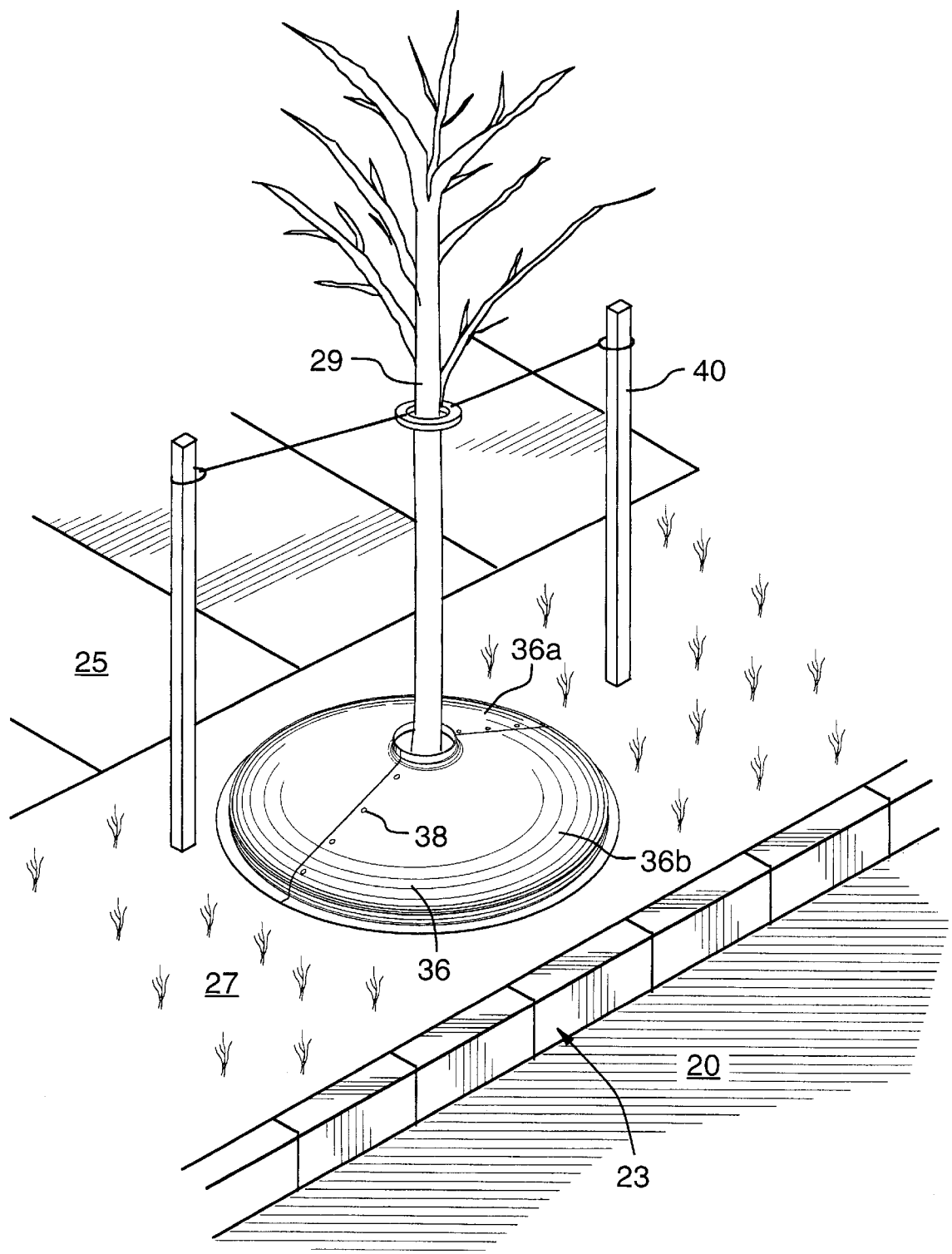
FIG. 2 is a pictorial view of the tree and protector of FIG. 1.
Figure 3:
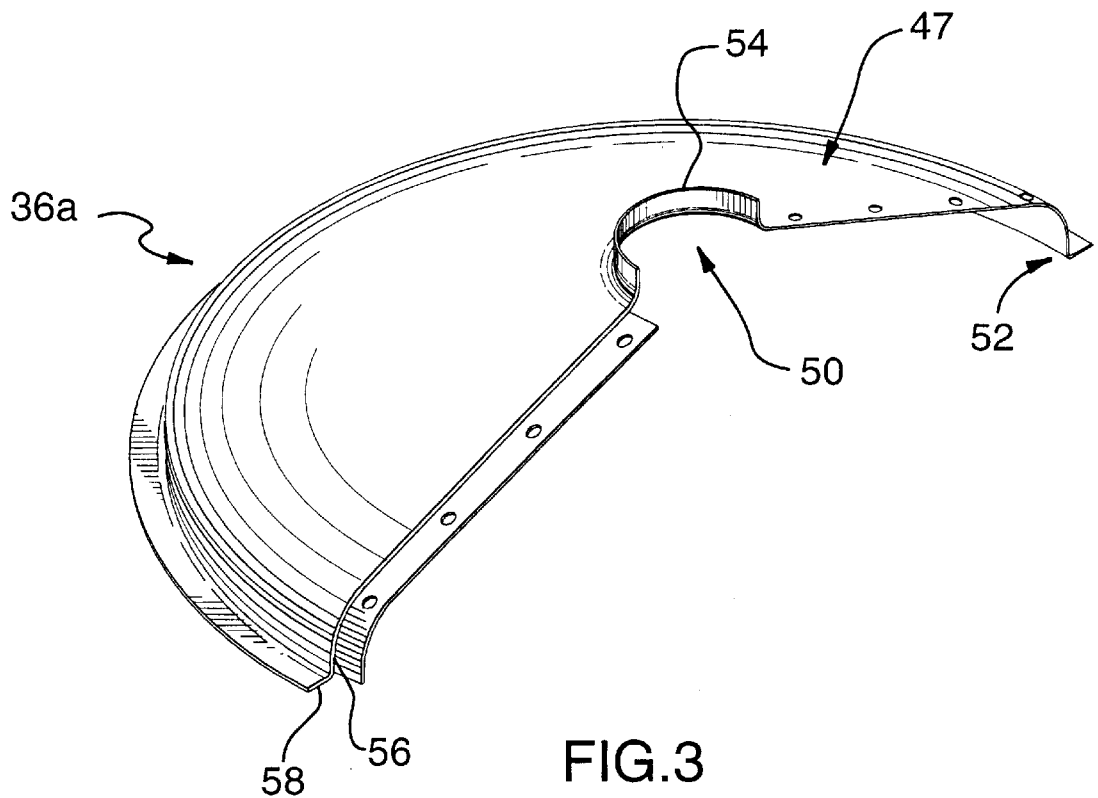
FIG. 3 is a pictorial view of one half of the protector of FIG. 1.

FIG. 2 is a pictorial view, showing the arrangement of the assembled tree protector 36. The tree protector is in two (identical) halves 36a,36b (FIG. 3). The two halves are assembled around the tree 29, and secured together using fasteners 38.

Generally, the protectors are applied to the trees at the time of, or shortly after, the trees are first planted, and the task is carried out as part of the tree-planting routine by the landscaping contractor, or by personnel of the city's parks department. As such, the protector should be light and easy to handle, and should be easy to reach down from the truck. Also, the designer should see to it that the protectors, or rather the halves of the protectors, are stackable, so that a number of the halves takes up little space on the truck, and the halves do not become stuck together.

As usual with newly-planted trees, support-posts 40 are provided. The protector 36 should be put in place around the tree before the support posts are driven in. It may be noted that the presence of the protector ensures that the posts are not placed too close to the tree; there have been many cases where carelessly-placed support posts have pierced the root-ball of a tree, and the damage from that can tip the scales against an already vulnerable tree.

Figure 4:
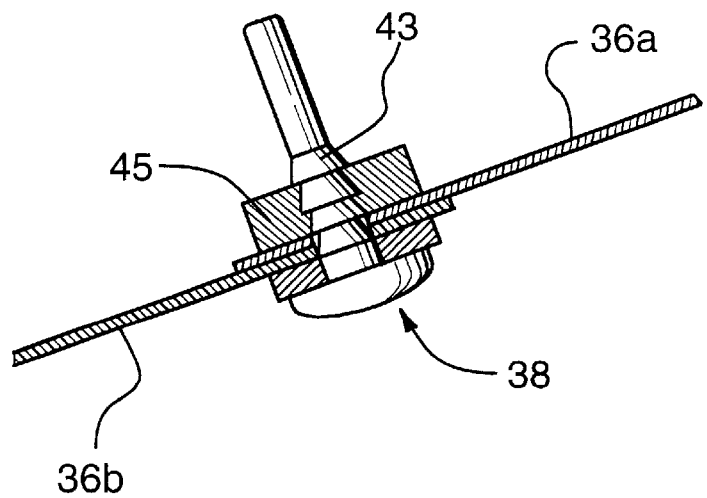
FIG. 4 is a cross-section of one of the fasteners of the protector of FIG. 1.

The fasteners 38 should be vandal-proof. FIG. 4 is a section of one of the fasteners; a barbed stem 43, made of plastic, passes through aligned holes in the halves 36a,36b, and a washer 45 is pressed down over the barbs. When the washer 45 is firmly snagged, the protruding stalk of the stem is trimmed off.

The resulting fastener is secure against casual vandals. The designer should provide a fastener that is strong and secure enough that the fastener cannot be removed without the use of tools. A curtailment of the vandals' amusement may be assumed, if they would have to prepare themselves beforehand in order to remove the protectors. Also, the designer should arrange that the fastener cannot be removed simply by reaching underneath the protector. The fastener should be secure, but there is no need for it to be tight. Other forms of fastener are appropriate, including metal or plastic rivets, especially those of the pull-through type.

When the time comes for the city to remove the protectors, a tool in the form of a punch or drill may be used to destroy the fasteners. Each protector uses six or eight fasteners, and it is important that the fastener remain intact upon being broken, so it can be easily picked up. It may be preferred that the fasteners be of the type that remains attached into one of the halves of the protector, whereby the broken fasteners are finally removed back at the depot.

With the right tools, the fastener can be inserted and locked in a moment, with almost total reliability, and can be removed similarly. The type of fastener that can be inserted and locked all from one side, i.e without needing access from underneath the protector, is advantageous, and preferred.

It is important that the holes in the halves be not damaged by the insertion and removal of the fastener: the fastener itself may be discarded, but the halves will generally be suitable for re-use a number of times. The protectors should remain around the trees for a period of about two years, after which the trees may be expected to have become established and self-sustaining. In some cases, it may be preferred to place the protectors around the trees just for the (first two) winters, and to take the protectors off for the summers.

The protector should be strong enough in itself to survive a certain amount of abuse. For example, it is quite likely that children will jump on the cone area; it is not necessary to make the protector rigid enough that it does not distort under such abuse, but the designer should see to it that the protector is strong enough to spring back afterwards if it is distorted. A tough plastic such as polyethylene, in a thickness of about 1.5 mm to 2.0 mm, has been found satisfactory.

The protector should be large enough to extend beyond the root-ball of the tree. Typically, a circular protector, as shown, will have a diameter of about a meter. As a minimum, the protector should cover an area of about 0.3 sq meters, centered over the root-ball, to be effective.

The halves may be injection-moulded in a suitable roadside plastic, such as polyethylene. Alternatively, the economics may dictate that the halves be vacuum-moulded, or layered-up onto a mold, in fibre-glass plastic, for example. Alternatively, the components of the protector may be blow-moulded or rotary-moulded.

The nature and thickness of the material are such that the assembled protector forms a rigid cone. However, the halves need not be rigid in themselves, although the halves should be robust enough to accommodate being transported and manhandled.

The material may be made unobtrusive, to an extent, by being coloured green.

The main form of the protector is conical. This is important, in the invention, because the slope deflects the salt to the sides of the root-ball. It is important that accumulation of the salt, and of snow, rain etc, should be discouraged. Even though the salt is deflected away from the roots, it is preferable that the salt be diluted as much as possible. The conical slope of the protector ensures that the precipitation water does not collect, but passes off the protector, and enters the ground with the salt. The surface of the material of the cone should be smooth, for the same reasons. If ridges are provided (for stiffening the cone structure), the ridges should preferably be so arranged as to direct water downwards and outwards towards the flange of the protector.

Of course, the cone must slope outwards and downwards from the center, as shown: it would be quite contrary to the purpose of the invention for the cone to slope inwards. In the past, rain collectors, having an inward-sloping cone, have been placed under trees, but such devices are quite unsuitable for protecting the trees from winter salt.

The conical-portion 47 of the protector should be steeply-sloping enough to discourage accumulation of precipitation. A maximum included cone angle of about 150 degrees is appropriate. The more steeply sloping the cone, the better, within the limitations of overall height appropriate to a tree. The conical shape of the protector, in addition to serving to deflect the salt aside, also means that the protector is strong, and easily able to support the weight of piled-up snow.

The shape of the protector is also effective in preventing physical damage to trees, as for example, (during the summer) damage from grass cutters and trimmers. In fact, during summer, the presence of the protector means that growth of grass (and weeds) is inhibited, and moisture is retained, under the protector, so that cutters need not approach closely.

The aperture 50 in the center of the protector should be large enough to accommodate the growing tree. However, there is no need for the protector to be tightly sealed against the trunk of the tree, in that a small quantity of salt can be tolerated. Preferably, the fit should be tight enough to discourage rodents etc from entering and spending the winter underneath the protector, although rodents are attracted to tight spaces rather than to the cavernous open space under the protector. The outer rim 52 of the protector may be staked to the ground, if desired. The protector may also be secured to the posts 40, if desired. Cut-outs may be provided in the flange, to guide the placement of the posts 40.

The protector need cause little interference with watering the tree. During the early stages, water may be hosed into the annular gap between the trunk and the aperture 50 in the protector. With the use of the protector, even though the area of ground immediately above the root-ball does not receive the rain water directly, in any case, water soaking into the ground around the outside of the protector is generally as, or more, effective to water the tree than water poured directly onto the root ball.

With care, water can be hosed into the annular gap between the trunk and the aperture 50; but apart from that, the neck 54 of the aperture should be small enough that substantially none of the snow or slush heaped or flung onto the verge from snow-ploughing operations, would enter through the gap. The neck 54 should have a diameter of no more than 20 cm, and 15 cm is preferred, given that the protector is to be used with young trees having a diameter around 4 cm when planted, and around 10 cm by the time the protector is removed.

It may be noted that rain falling on the tree in fact can enter the annular gap between the trunk and the aperture 50 in quite large quantities, because rain collected on the tree tends to be channeled onto the branches, and thence onto the trunk. Rainwater running down the trunk can pass through the gap. Thus, the small annular aperture is effective to allow (some) rainwater to pass through, down the trunk, and yet is effective to prevent substantially all the salt-laden slush from passing through.

The neck 54 of the aperture is vertical and cylindrical, so that any slush etc impinging on the neck will tend immediately to fall away, outside the protector. The neck 54 merges smoothly into the conically-sloping portion 47 of the protector, whereby the slush landing thereupon is urged downwards and away from the tree trunk.

The outer rim 52 of the protector should be rigid. As shown, the outer rim includes a portion 56 that is (almost) right-cylindrical, and a flat-flange portion 58. This combination of shapes gives excellent rigidity, without requiring a bulk of material, especially after the two halves have been assembled and fastened into the whole protector.

The protector need not be circular. If the grass verge 27 is narrow, for example, it may be preferred that the protector be rectangular, or elliptical, the major dimension being aligned in the direction of the road. However, the sloping cone shape should still be smooth and regular in that case.

The protector as described is in two halves. It is contemplated that the protector may be made in just one piece. The cone form in that case is moulded or otherwise incorporated into the one piece, and the piece is suitably slit, to allow the piece to be assembled onto and around the tree. Fasteners are used to join up the slit after assembly. A one-piece protector reduces the number of fasteners required, and the labor costs of applying and removing the fasteners, and is a little more robust. However, the two-piece construction is preferred, for economy of manufacture, for stackability, and for ease of handling during storage and transport, and during assembly and disassembly.

I claim:

1. Tree protector, in combination with a tree planted in the ground, wherein:

the protector comprises a sheet of weather-resistant material, having the general form of an inverted cone, including an outer rim, a conically-sloping portion, and a central aperture;

the protector includes a separably-fastenable joint means;

the joint means is so constructed and arranged that, upon the joint means being separated and unfastened, the outer rim, the conically-sloping portion, and the central aperture are open to a sufficient extent as to permit the protector to be applied to, and assembled around, in a radial or lateral direction, the trunk of an already-planted tree, and to rest on the around in which the tree is planted, and to be removed from around the tree without disturbing the tree;

the protector includes fastening means, for fastening the joint means closed;

the joint means is so constructed and arranged that, upon the joint means being closed and fastened by the fastening means, the outer rim, the conically-sloping portion, and the central aperture are closed to a sufficient extent as to prevent the protector from being removed from the tree, the trunk of the tree lying within the aperture when the joint means is closed and fastened;

the aperture is large enough to fit loosely around the trunk of the tree;

the aperture is small enough as to permit substantially no slush or snow to enter between the aperture and the trunk;

the protector lies assembled around the trunk of the tree, and the aperture in the neck is a loose fit on the trunk, and the outer rim rests on the ground.

2. The combination of claim 1, wherein the aperture is formed in a neck of the protector, and the protector is so shaped that the neck merges smoothly into the conically-sloping portion, whereby water or slush landing upon the neck or conically-sloping portion is urged downwards and away from the tree trunk.

3. The combination of claim 2, wherein the aperture in the neck has a diameter of no more than 20 cm.

4. The combination of claim 1, wherein the protector is in two separable halves, and the fastening means comprises a means for joining the two halves together, on the ground, around the tree.

5. The combination of claim 4, wherein the two halves are identical.

6. The combination of claim 1, wherein the fastening means is of such a structure as to be resistant to vandalism.

7. The combination of claim 6, wherein the fastening means is of such a structure that it cannot be released by hand manipulation, in the absence of tools.

8. The combination of claim 1, wherein the protector is of such a structure as to extend, when operationally assembled around a tree, over an area of at least 0.3 square meters, directly over the root-ball of the tree.

9. The combination of claim 1, wherein the protector is circular, and has an overall diameter of at least 1 meter.

10. The combination of claim 1, wherein the protector includes a rigid outer flange.

11. The combination of claim 10, wherein the protector includes a cut-out in the flange, whereby a support-post for the tree may be driven into the ground close to the tree, without passing through the material of the flange.

12. The combination of claim 10, wherein the protector has an outer rim, comprising a portion that is approximately right-cylindrical, and a flat-flange portion.

13. The combination of claim 10, wherein the dimensions of the flange are such that the flange occupies only a small marginal rim around the conically-sloping portion of the protector.

14. The combination of claim 1, wherein the conically-sloping portion has an included angle of less than 150 degrees.

15. The combination of claim 1, wherein the protector is of a generally robust nature, to the extent that the protector, if stepped upon by a person, will spring back substantially without damage.

16. The combination of claim 1, wherein the material of the protector is polyethylene, and is at least 1.5 mm thick.

17. The combination of claim 1, wherein:

the tree has a trunk of a diameter TD and has a root ball of diameter RBD;

the aperture has a diameter between 5 and 10 cm greater than TD;

the overall diameter of the protector is not less than RBD.

18. The combination of claim 1, wherein the design of the protector is such that the conically-sloping portion of the protector, in plan view of the protector in use, occupies almost the whole area of the protector.

* * * * *